(12) United States Patent
Yokochi et al.

(10) Patent No.: US 12,541,070 B2
(45) Date of Patent: Feb. 3, 2026

(54) OPTICAL FIBER CABLE

(71) Applicant: SUMITOMO ELECTRIC INDUSTRIES, LTD., Osaka (JP)

(72) Inventors: Takayuki Yokochi, Osaka (JP); Kenichiro Otsuka, Osaka (JP); Takayuki Shimazu, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 395 days.

(21) Appl. No.: 18/058,952

(22) Filed: Nov. 28, 2022

(65) Prior Publication Data
US 2023/0176306 A1    Jun. 8, 2023

(30) Foreign Application Priority Data
Dec. 3, 2021    (JP) .................................. 2021-196998

(51) Int. Cl.
*G02B 6/44*    (2006.01)
(52) U.S. Cl.
CPC .......... *G02B 6/4431* (2023.05); *G02B 6/4403* (2013.01); *G02B 6/4472* (2013.01)
(58) Field of Classification Search
None
See application file for complete search history.

(56) References Cited

U.S. PATENT DOCUMENTS

| | | | | |
|---|---|---|---|---|
| 5,761,361 A | * | 6/1998 | Pfandl | G02B 6/4407 385/103 |
| 7,127,143 B2 | * | 10/2006 | Elkins, II | G02B 6/4475 385/100 |
| 7,277,614 B2 | * | 10/2007 | Cody | G02B 6/3807 385/100 |
| 7,346,243 B2 | | 3/2008 | Cody et al. | |
| 7,693,374 B2 | | 4/2010 | Cody et al. | |
| 8,582,938 B2 | | 11/2013 | Cody et al. | |
| 10,371,917 B2 | | 8/2019 | Cooke et al. | |
| 10,379,311 B1 | * | 8/2019 | Krywicki | G02B 6/4478 |
| 10,437,003 B2 | * | 10/2019 | Jensen | G02B 6/4475 |
| 10,598,888 B2 | * | 3/2020 | Sato | G02B 6/4405 |
| 10,678,012 B1 | * | 6/2020 | Wu | G02B 6/44715 |
| 10,712,519 B2 | | 7/2020 | Faulkner et al. | |
| 2003/0016934 A1 | * | 1/2003 | Sun | G02B 6/4472 385/137 |
| 2013/0294735 A1 | * | 11/2013 | Burris | G02B 6/255 385/101 |
| 2017/0343759 A1 | * | 11/2017 | Kishimoto | G02B 6/44785 |
| 2018/0196211 A1 | * | 7/2018 | Agata | G02B 6/4486 |
| 2019/0049685 A1 | * | 2/2019 | Jensen | G02B 6/4475 |

(Continued)

FOREIGN PATENT DOCUMENTS

| | | |
|---|---|---|
| JP | S61-002110 A | 1/1986 |
| JP | 2001-051131 A | 2/2001 |

(Continued)

*Primary Examiner* — Jerry Rahll
(74) *Attorney, Agent, or Firm* — McDonald Hopkins LLC

(57) ABSTRACT

An optical fiber cable includes a plurality of optical fiber cords and a trunk section in which the plurality of optical fiber cords are bundled in a cross section honeycomb shape, and each optical fiber cord included in the plurality of optical fiber cords is separably connected to at least one of other optical fiber cords adjacent to the optical fiber cord in the trunk section.

19 Claims, 6 Drawing Sheets

(56) References Cited

U.S. PATENT DOCUMENTS

2021/0103116 A1\* 4/2021 Frye .................... G02B 6/4413
2022/0043226 A1\* 2/2022 Andrus ................ G02B 6/4413

FOREIGN PATENT DOCUMENTS

| JP | 2001-116968 A | 4/2001 |
| JP | 2001-201641 A | 7/2001 |
| JP | 2005-208193 A | 8/2005 |
| JP | 2021-157154 A | 10/2021 |

\* cited by examiner

OPTICAL FIBER CABLE

TECHNICAL FIELD

The present disclosure relates to optical fiber cables. This application claims priority based on Japanese Patent Application No. 2021-196998 filed on Dec. 3, 2021, the entire contents of which are incorporated herein by reference.

BACKGROUND

Japanese Unexamined Patent Publication Nos. 2001-51131, 2001-116968, and 2001-201641, and U.S. Pat. Nos. 7,127,143, 7,346,243, 7,693,374, 8,582,938, 10,437,003, and 10,712,519 each disclose various optical fiber cables used in optical communication. Japanese Unexamined Patent Publication No. 2005-208193 discloses an optical microbox for connecting a branch cable branched from an optical trunk cable and a termination cable. U.S. Pat. No. 10,371,917 discloses a data center comprising an optical fiber or the like.

SUMMARY

An optical fiber cable according to an aspect of the present disclosure includes a plurality of optical fiber cords, and a trunk section in which the plurality of optical fiber cords are bundled in a cross section honeycomb shape, wherein each optical fiber cord included in the plurality of optical fiber cords is separably connected to at least one of other optical fiber cords adjacent to the optical fiber cord in the trunk section.

DETAILED DESCRIPTION

Figure 1:
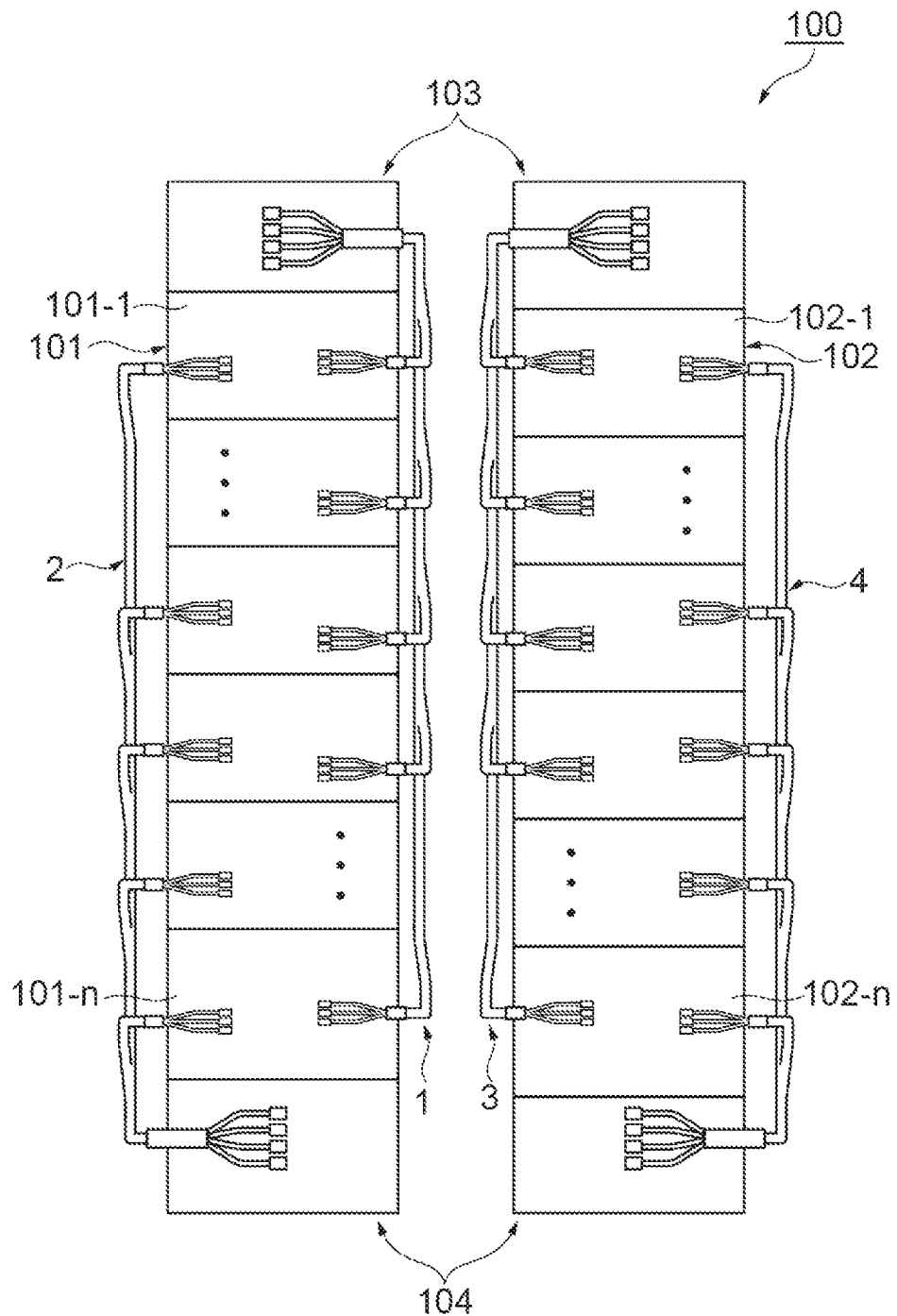
FIG. 1 is a schematic plan view illustrating an optical communication system including an optical fiber cable according to an embodiment.

Problems to be Solved by the Present Disclosure

In a data center or the like as described in U.S. Pat. No. 10,371,917, for example, an optical cable including a plurality of optical fiber cords (tethers) as shown in U.S. Pat. No. 10,437,003 are used. If necessary, an optical fiber cord_is branched from the optical cable. In such branching of the optical fiber cord, precise work such as specifying the optical fiber cord to be branched and branching only the specified optical fiber cord is necessary. Therefore, there is a demand for an optical fiber cable that can facilitate the branching operation.

Effects of the Present Disclosure

According to the present disclosure, it is possible to provide an optical fiber cable capable of realizing facilitation of branching work of optical fiber cords.

DESCRIPTION OF EMBODIMENTS OF THE PRESENT DISCLOSURE

First, contents of embodiments of the present disclosure will be described as follows.

An embodiment of the present disclosure is an optical fiber cable including a plurality of optical fiber cords and a trunk section in which the plurality of optical fiber cords are bundled in a cross section honeycomb shape, wherein each optical fiber cord included in the plurality of optical fiber cords is separably coupled to at least one of other optical fiber cords adjacent to the optical fiber cord in the trunk section.

In this optical fiber cable, a plurality of optical fiber cords are bundled in a cross section honeycomb shape in a trunk section. Accordingly, when one optical fiber cord is branched from the trunk section, one of the outermost optical fiber cords in the plurality of optical fiber cords may be branched. In this case, the optical fiber cord to be branched can be specified from a part of the optical fiber cords specified in terms of structure, and the specified optical fiber cord can be selectively stripped. Therefore, by using the optical fiber cable, the branching operation of the optical fiber cord can be facilitated.

The optical fiber cable may further include a branch member configured to accommodate one end of each of the plurality of optical fiber cords, wherein the plurality of optical fiber cords may include a first optical fiber cord and a second optical fiber cord located closer to a center side of the trunk section than the first optical fiber cord, and a first position where the first optical fiber cord branches from the trunk section may be closer to the branch member than a second position where the second optical fiber cord branches from the trunk section in an extending direction of the trunk section. In this case, for example, by adjusting the length of each optical fiber cord in advance, a branching order and branching positions of the optical fiber cords can be determined more easily.

Each optical fiber cord included in the plurality of optical fiber cords may be separably connected to all of other adjacent optical fiber cords in the trunk section. In this case, even if the optical fiber cords in the trunk section are not fixed by a tube or the like, it is possible to suppress the optical fiber cords from being dispersed.

In the trunk section, the plurality of optical fiber cords may be named in accordance with a predetermined rule along a clockwise spiral or a counterclockwise spiral in a cross section intersecting a longitudinal direction of the plurality of optical fiber cords. In this case, it is possible to more easily specify the optical fiber cord to be branched. In addition, each optical fiber cord can be easily distinguished by naming in accordance with the above rules.

The trunk section may be a wound structure of a tape-like cable including a plurality of optical fiber cords arranged along one direction intersecting a longitudinal direction of the plurality of optical fiber cords and a connecting portion connecting optical fiber cords adjacent to each other in one direction, the optical fiber cords being included in the plurality of optical fiber cords, and the plurality of optical fiber cords may be sequentially named in accordance with a predetermined rule, in a winding direction of the tape-like cable or a direction opposite to the winding direction. In this case, since the optical fiber cords can be branched one by one along the winding direction, it is possible to more easily specify the optical fiber cord to be branched. In addition, each optical fiber cord can be easily distinguished by naming in accordance with the above rules.

An optical fiber cord located closer to a center of the trunk section may be longer. Alternatively, the optical fiber cord located closer to the center of the trunk section may be shorter.

DETAILS OF EMBODIMENT OF THE PRESENT DISCLOSURE

A specific example of an optical fiber cable according to an embodiment of the present disclosure will be described below with reference to the drawings. It should be noted that the present disclosure is not limited to these examples, but is defined by the scope of claims and is intended to include all modifications within the meaning and scope equivalent to the scope of claims. In the following description, the same reference numerals are given to the same elements in the description of the drawings, and redundant description will be omitted.

FIG. 1 is a schematic plan view illustrating an optical communication system including an optical fiber cable according to the present embodiment. An optical communication system 100 illustrated in FIG. 1 is a group of devices provided in a data center, a base station, or the like, and includes a server rack group 101, 102, a distribution frame 103, 104, and optical fiber cables 1 to 4.

Each server rack group 101, 102 is formed by arranging n server racks (n is a natural number of 2 or more) in order in a predetermined direction. The server rack group 101 includes a plurality of server racks 101-1 to 101-n arranged in one direction in a plan view. Each of the server racks 101-1 to 101-n is a rack on which a plurality of physical servers (not illustrated) are placed. Each of the server racks 101-1 to 101-n is provided with a plurality of shelves (not shown) arranged in a vertical direction. A physical server or the like is placed on each of the plurality of shelves. Like the server rack group 101, the server rack group 102 includes a plurality of server racks 102-1 to 102-n arranged in one direction in a plan view.

Each of the distribution frames 103, 104 is a line concentrator that accommodates communication lines (optical fiber cables) used in the optical communication system 100. External multi-core cables (not shown) connected to each of the distribution frames 103, 104 are respectively divided and arranged into a plurality of communication lines. In the distribution frames 103, 104, termination processing of optical fiber cables may be performed. A termination unit that holds the multi-core optical wiring and accommodates connection points may be mounted on the distribution frames 103, 104. In the present embodiment, each of the distribution frames 103, 104 is an intermediate distribution frame (IDF), but is not limited thereto. In addition, the distribution frame 103 is connected to an external multi-core cable (not illustrated) which is a working line, and the distribution frame 104 is connected to an external multi-core cable (not illustrated) which is a spare line.

The optical fiber cable 1 is a multi-core cable connecting the server rack group 101 and the distribution frame 103. Similarly, the optical fiber cable 2 is a multi-core cable connecting the server rack group 101 and the distribution frame 104, the optical fiber cable 3 is a multi-core cable connecting the server rack group 102 and the distribution frame 103, and the optical fiber cable 4 is a multi-core cable connecting the server rack group 102 and the distribution frame 104. In this embodiment, the optical fiber cables 1 and 3 are used as working lines, and the optical fiber cables 2 and 4 are used as spare lines. The optical fiber cables 1 to 4 may have the same structure or may have different structures each other.

Figure 2:
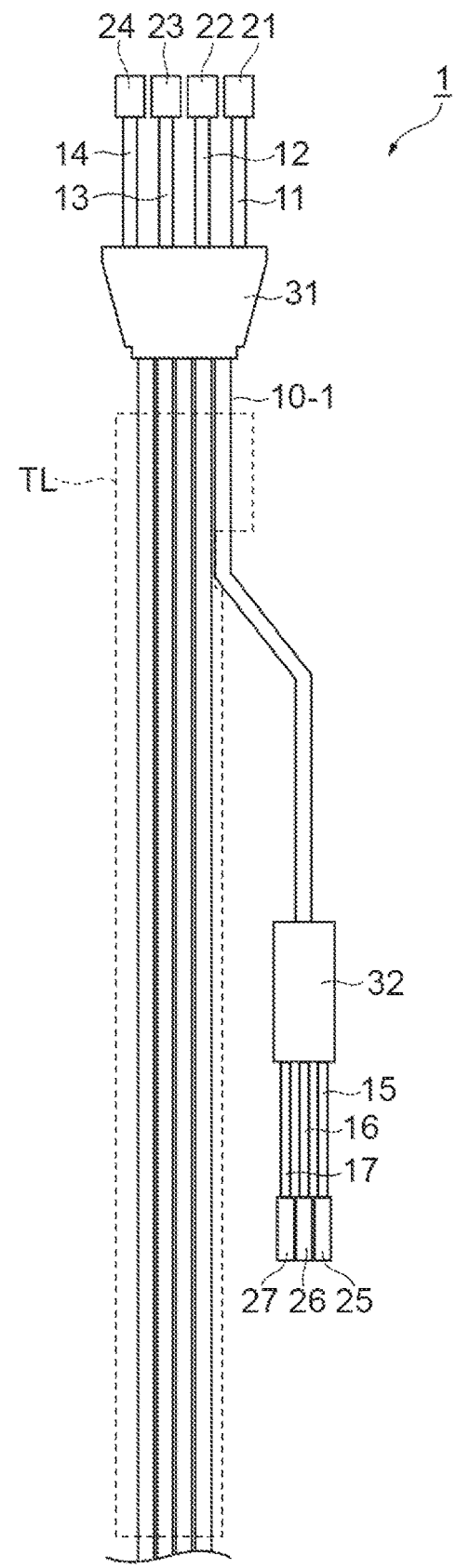
FIG. 2 is a schematic plan view illustrating a main part of the optical fiber cable shown in FIG. 1.
Figure 3:
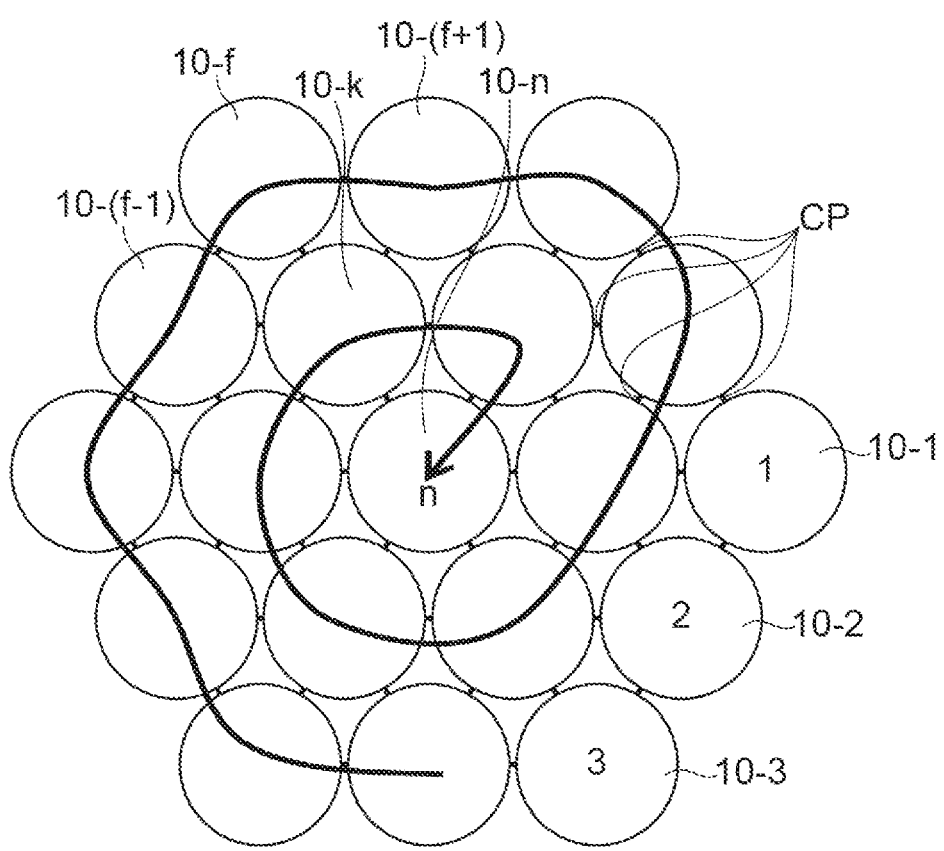
FIG. 3 is a schematic cross sectional view illustrating a part of an optical fiber cable.

FIG. 2 is a schematic plan view illustrating a main part of the optical fiber cable 1 shown in FIG. 1. FIG. 3 is a schematic cross sectional view illustrating a part of an optical fiber cable. As illustrated in FIGS. 2 and 3, the optical fiber cable 1 includes a plurality of optical fiber cords 10-1 to 10-n (n is a natural number of 2 or more), multicore optical fiber cords 11 to 14, branch optical fiber cords 15 to 17, first connectors 21 to 24, second connectors 25 to 27, a first branch member 31, and a second branch member 32.

The plurality of optical fiber cords 10-1 to 10-n are main portions located between the server rack group 101 and the distribution frame 103 in the extending direction of the optical fiber cable 1. Each of the plurality of optical fiber cords 10-1 to 10-n is, for example, a cord including a plurality of core wires. In the present embodiment, each of the optical fiber cords 10-1 to 10-n is a six core cord, but is not limited thereto. One end of each of the optical fiber cords 10-1 to 10-n is accommodated in the first branch member 31. The other end of the optical fiber cord 10-1 is accommodated in the second branch member 32. Similarly, the other end of each optical fiber cord other than the optical fiber cord 10-1 is accommodated in a corresponding second branch member (not shown). Each of the optical fiber cords 10-1 to 10-n is reinforced by, for example, a reinforcing tube. The lengths of the optical fiber cords 10-1 to 10-n may be determined in advance or may be equal to each other.

The optical fiber cable 1 includes a trunk section TL in which a plurality of optical fiber cords 10-1 to 10-n are bundled in a cross section honeycomb shape. Hereinafter, the trunk section TL will be described as a portion in which two or more of the plurality of optical fiber cords 10-1 to 10-n are bundled along the longitudinal direction. The optical fiber cord 10-1 is located on an outermost of the trunk section TL, and the optical fiber cord 10-n is located on closest to a center side of the trunk section TL. The optical fiber cord located closer to the center of the trunk section TL may be longer, or the optical fiber cord located closer to the center of the trunk section TL may be shorter. In the present embodiment, when the cross section of at least one optical fiber cord among the plurality of optical fiber cords 10-1 to 10-n is surrounded by the cross sections of six optical fiber cords in at least a part of the trunk section TL, it can be said that the plurality of optical fiber cords 10-1 to 10-n are bundled in a cross section honeycomb shape.

In the trunk section TL, each optical fiber cord included in the plurality of optical fiber cords 10-1 to 10-n is connected to at least one of other optical fiber cords adjacent to the optical fiber cord. In the present embodiment, in the trunk section TL, a predetermined optical fiber cord is connected to all other optical fiber cords adjacent to the predetermined optical fiber cord via a connecting portion CP. Accordingly, a plurality of connecting portions CP are formed in the trunk section TL. For example, as shown in FIG. 3, the outermost optical fiber cord 10-f (f is a natural number less than n) in the trunk section TL is connected to each of optical fiber cords 10-(f−1), 10-(f+1), and 10-k (k is a natural number greater than (f+1) and less than or equal to n) adjacent to the optical fiber cord 10-f via a respective connecting portion CP. Hereinafter, the optical fiber cord 10-f may be referred to as a first optical fiber cord, and the optical fiber cord 10-k located closer to the center of the trunk section TL than the first optical fiber cord may be referred to as a second optical fiber cord.

The connecting portions CP are portions that bundles the plurality of optical fiber cords 10-1 to 10-n in the trunk section TL, and is formed of, for example, an adhesive. In the present embodiment, the connecting portion CP is formed of an adhesive. The adhesive may be provided in the entire trunk section TL or may be provided in a part of the trunk section TL. In FIG. 3, the connecting portion CP connecting the optical fiber cords 10-f and 10-(f–1) and the connecting portion CP connecting the optical fiber cords 10-f and 10-(f+1) are displayed as separate bodies each other, but the present disclosure is not limited thereto. In a predetermined cross section of the trunk section TL, the connecting portion CP may be a single body. Further, the connecting portion CP is provided continuously or intermittently with respect to the trunk section TL in the extending direction of the trunk section TL. Each of the plurality of optical fiber cords 10-1 to 10-n is separably fixed by adjusting the type, amount, and the like of the adhesive forming the connecting portion CP. That is, each connecting portion CP is formed so as to be breakable without using any tool by adjusting the type, amount, and the like of the adhesive. For example, each of the plurality of optical fiber cords 10-1 to 10-n is peeled off from the trunk section TL by being pulled in a direction intersecting the extending direction. In each of the plurality of optical fiber cords 10-1 to 10-n, the position (branching position) at which the optical fiber cord is separated from the trunk section TL can be adjusted by setting the breaking position of the connecting portion CP.

Each of the plurality of optical fiber cords 10-1 to 10-n is branched when the connecting portion CP is broken. Due to the structure of the trunk section TL, the optical fiber cord is branched from an optical fiber cord located outside the trunk section TL. In this embodiment, the optical fiber cords are branched in order from the optical fiber cord having the smallest number. Therefore, in the extending direction of the trunk section TL, the branch position of the optical fiber cord having a smaller number may be closer to the first branch member 31. For example, the branch position (first position) of the optical fiber cord 10-f may be closer to the first branch member 31 than the branch position (second position) of the optical fiber cord 10-k.

The plurality of optical fiber cords 10-1 to 10-n are named in accordance with a predetermined rule. The predetermined rule may be, for example, a rule in which the order can be easily grasped, such as a number (from a small number to a large number or from a large number to a small number), an alphabet (from A to Z or from Z to A), or other characters, symbols or the like. Therefore, characters, symbols, or the like to be used are limited to those having ascending order or descending order. In the present embodiment, as illustrated in FIG. 3, the numbers of the plurality of optical fiber cords 10-1 to 10-n are named in order along a clockwise (right-handed) spiral in a cross section intersecting the longitudinal direction of the plurality of optical fiber cords 10-1 to 10-n. Accordingly, in the plurality of optical fiber cords 10-1 to 10-n, an optical fiber cord positioned on the outer side of the trunk section TL is named with a smaller number, and an optical fiber cord positioned on the center side of the trunk section TL is named with a larger number. The plurality of optical fiber cords 10-1 to 10-n may be named in order along a counterclockwise (left-handed) spiral. In this case, for example, among the plurality of optical fiber cords 10-1 to 10-n, an optical fiber cord located on the outer side of the trunk section TL is named with a larger number, and an optical fiber cord located on the center side of the trunk section TL is named with a smaller number. Note that the number assigned to the optical fiber cord having the smallest number is not necessarily the first number ("1").

Each of the multicore optical fiber cords 11 to 14 is a communication line located between the distribution frame 103 and the first branch member 31 in the extending direction of the optical fiber cable 1. Each of the multicore optical fiber cords 11 to 14 is a cord including more core wires than the optical fiber cord 10-1. The number of core wires included in one multi-core optical fiber cord may be equal to a multiplier of the number of optical fiber cords included in the multi-core optical fiber cord and the number of core wires included in the optical fiber cord. In the present embodiment, each of the multicore optical fiber cords 11 to 14 is a 24-core cord, and thus includes four optical fiber cords. One end of each of the multicore optical fiber cords 11 to 14 is accommodated in the first branch member 31. The other end of the multicore optical fiber cord 11 is accommodated in the first connector 21. Similarly, the other ends of the multicore optical fiber cords 12 to 14 are accommodated in first connectors 22 to 24, respectively. Each of the multicore optical fiber cords 11 to 14 is reinforced by, for example, a reinforcing tube.

Each of the first connectors 21 to 24 is an interface connected to the distribution frame 103. Each of the first connectors 21 to 24 is, for example, a multi-fiber push-on connector (MPO connector). In this case, the number of optical fibers coupled to the first connector 21 corresponds to the number of optical fibers included in the multicore optical fiber cord 11. The same applies to the first connectors 22 to 24.

Each of the branch optical fiber cords 15 to 17 is a communication line located between the server rack group 101 and the second branch member 32. Each of the branch optical fiber cords 15 to 17 is a cord including fewer core wires than the optical fiber cord 10-1. The number of core wires included in one optical fiber cord may be equal to a multiplier of the number of branch optical fiber cords accommodated in the optical fiber cord and the number of core wires included in the branch optical fiber cord. In the present embodiment, each of the branch optical fiber cords 15 to 17 is a two core cord, and thus each of the optical fiber cords 10-1 to 10-n includes three branch optical fiber cords. One end of each of the branch optical fiber cords 15 to 17 is accommodated in the second branch member 32. The other end of the branch optical fiber cord 15 is accommodated in the second connector 25. Similarly, the other ends of the branch optical fiber cords 16, 17 are respectively accommodated in second connectors 26, 27. Each of the branch optical fiber cords 15 to 17 is reinforced by, for example, a reinforcing tube.

Each of the second connectors 25 to 27 is an interface connected to the server rack group 101. Each of the second connectors 25 to 27 is, for example, a data link connector. The number of optical fibers coupled to the second connector 25 corresponds to the number of optical fibers included in the branch optical fiber cord 15. The same applies to the second connector 2627.

The first branch member 31 is a member that accommodates portions branched from the multicore optical fiber cords 11 to 14 into the optical fiber cords 10-1 to 10-n. A cavity is provided in the first branch member 31, and one ends of the multicore optical fiber cords 11 to 14 and one ends of the optical fiber cords 10-1 to 10-n are accommodated in the cavity. In the first branch member 31, the positions of the multicore optical fiber cords 11 to 14 and the positions of the optical fiber cords 10-1 to 10-*n* may be determined. In the first branch member 31, the core wires in the multicore optical fiber cords 11 to 14 are exposed by removing the reinforcing tubes and the like provided in the multicore optical fiber cords 11 to 14. The core wires are bundled as any core wire of optical fiber cords 10-1 to 10-*n*. In this case, the first branch member 31 also functions as a protective member for the core wires. In addition, since there is no optically connected portion (a fusion connection portion, a mechanical connection portion using an optical connector, or the like) between the multicore optical fiber cords 11 to 14 and the optical fiber cords 10-1 to 10-*n*, an optical loss is less likely to occur in the first branch member 31. In the first branch member 31, the positions of the optical fiber cords 10-1 to 10-*n* and the positions of the multicore optical fiber cords 11 to 14 may be determined. In the first branch member 31, an optical connection portion between the multicore optical fiber cord 11 and the optical fiber cord 10-1 may be provided. In this case, the first branch member 31 also functions as a protection member for the optical connection portion.

The second branch member 32 is a member that accommodates a portion branched from the optical fiber cord 10-1 to the branch optical fiber cords 15 to 17. A cavity is provided in the second branch member 32, and one end of the optical fiber cord 10-1 and one ends of the branch optical fiber cords 15 to 17 are accommodated in the cavity. In the second branch member 32, the core wires of the optical fiber cord 10-1 are exposed by removing a reinforcing tube or the like provided in the optical fiber cord 10-1. The core wires are bundled as core wires of any of branch optical fiber cords 15 to 17. In this case, the second branch member 32 also functions as a protective member for the core wires. In addition, since there is no optical connecting portion between the optical fiber cords 10-1 to 10-*n* and the branch optical fiber cords 15 to 17, optical loss is less likely to occur in the second branch member 32. In the second branch member 32, the position of the optical fiber cord 10-1 and the positions of the branch optical fiber cords 15 to 17 may be determined. In the second branch member 32, for example, an optical connection portion between the optical fiber cord 10-1 and the branch optical fiber cords 15 to 17 may be provided. In this case, the second branch member 32 also functions a protection member for the optical connection portion. According to the optical fiber cable 1 of the present embodiment described above, a plurality of optical fiber cords 10-1 to 10-*n* are bundled in a cross section honeycomb shape in the trunk section TL. Thus, when one optical fiber cord is branched from the trunk section TL, one of the optical fiber cords 10-1 to 10-*n* located on the outermost side can be selectively branched. In this case, the optical fiber cord to be branched optical fiber cord can be easily specified in terms of structure, and the specified optical fiber cord can be selectively peeled off. Therefore, by using the optical fiber cable, the branching operation of the optical fiber cord can be facilitated.

In addition, as described above, in the trunk section TL, a plurality of optical fiber cords 10-1 to 10-*n* are bundled in a cross section honeycomb shape. Accordingly, when one optical fiber cord is branched while the trunk section TL is gripped by an operator, a device, or the like, a force applied to the trunk section TL can be favorably dispersed. Therefore, it is possible to suppress damage to the optical fiber cable at the time of branching operation of the optical fiber cord.

In one example, the optical fiber cable 1 includes a first branch member 31 that accommodates one end of each of the plurality of optical fiber cords 10-1 to 10-*n*. The plurality of optical fiber cords 10-1 to 10-*n* include a first optical fiber cord (optical fiber cord 10-*f*) and a second optical fiber cord (optical fiber cord 10-*k*) located closer to the center of the trunk section TL than the first optical fiber cord. In this case, for example, by adjusting the length of each of the optical fiber cords 10-1 to 10-*n* in advance, it is possible to more easily determine the branching order and branching positions of the optical fiber cords 10-1 to 10-*n*. In one example, in the trunk section TL, each optical fiber cord included in the optical fiber cords 10-1 to 10-*n* is separably coupled to all of the other optical fiber cords. Therefore, even if the optical fiber cords 10-1 to 10-*n* in the trunk section TL are not fixed by a tube or the like, it is possible to suppress the optical fiber cords 10-1 to 10-*n* from becoming loose.

In one example, in the trunk section TL, the plurality of optical fiber cords 10-1 to 10-*n* are named in accordance with a predetermined rule along a clockwise spiral or a counterclockwise spiral. Therefore, it is possible to more easily specify the optical fiber cord to be branched. In addition, each optical fiber cord can be easily distinguished by naming in accordance with the above rules.

Hereinafter, an optical fiber cable according to a modification example will be described with reference to FIGS. 4A and 4B. In the description of the modification example, the description overlapping with the above-described embodiment will be omitted, and portions different from the above-described embodiment will be described. That is, the description of the above-described embodiment may be appropriately used in the modification examples within a technically possible range.

Figure 4A:
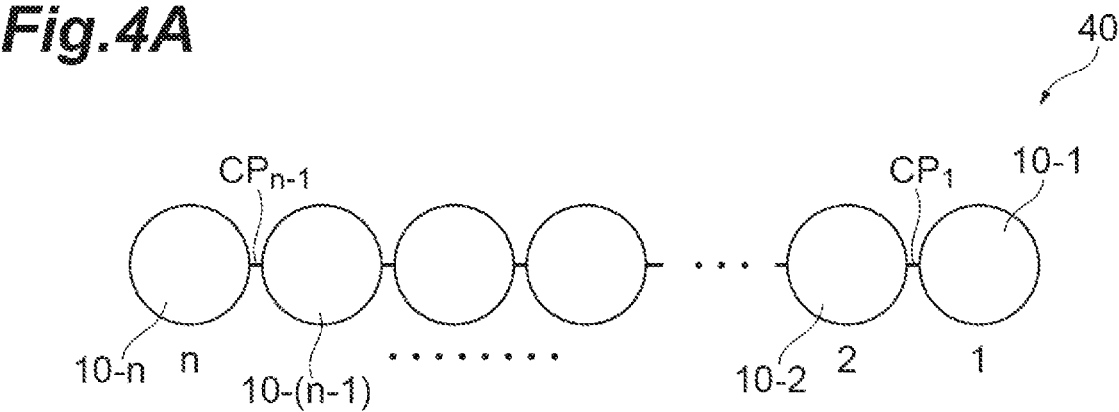
FIG. 4A is a schematic view illustrating a tape-like cable before winding according to a modification.
Figure 4B:
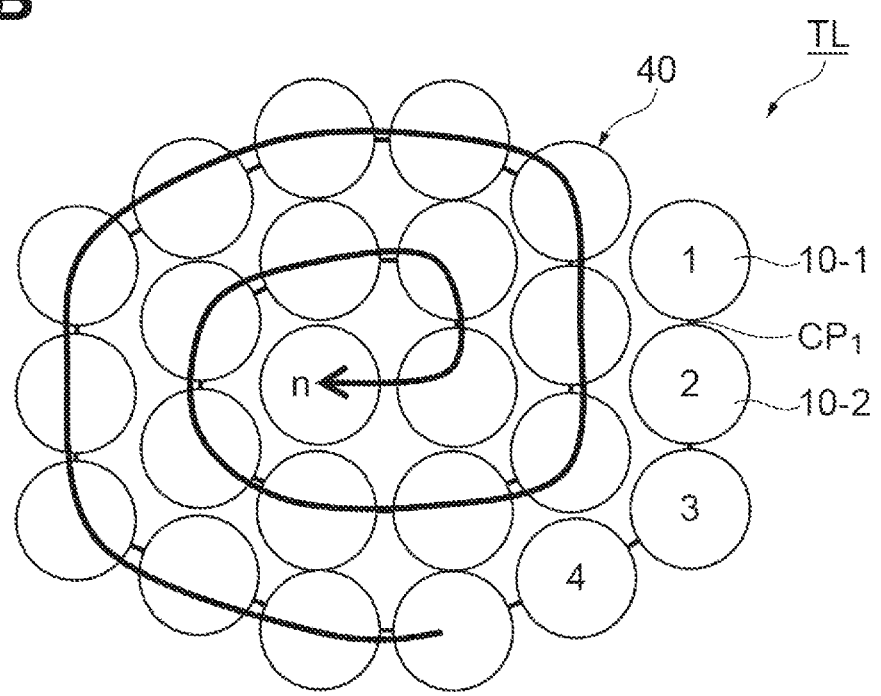
FIG. 4B is a schematic view illustrating a tape-like cable after winding.

FIG. 4A schematically shows the tape-like cable before winding, and FIG. 4B schematically shows the tape-like cable after winding. The tape-like cable 40 shown in FIG. 4A is a main portion located between the server rack group 101 and the distribution frame 103 (see FIG. 1) in the extending direction of the optical fiber cable 1, and has a substantially band shape. The tape-like cable 40 includes a plurality of optical fiber cords 10-1 to 10-*n* arranged along one direction, and connecting portions CP1 to CPn-1 that connect optical fiber cords adjacent to each other in the one direction among the plurality of optical fiber cords 10-1 to 10-*n*. The connecting portion CP1 connects the adjacent optical fiber cords 10-1 and 10-2. Similarly, the connecting portion CPn-1 connects optical fiber cords 10-*n* and 10-(n–1) adjacent to each other. In FIG. 4A, the connecting portions CP1 to CPn-1 are separate from each other, but are not limited thereto. For example, each of the connecting portions CP1 to CPn-1 may be a predetermined region in a single member. The single member is, for example, a resin member that covers the plurality of optical fiber cords 10-1 to 10-*n*. Note that the one direction is, for example, a direction orthogonal to the extending direction of the optical fiber cords 10-1 to 10-*n*.

As shown in FIG. 4B, the trunk section TL is a wound structure of the tape-like cable 40, and is formed by winding the tape-like cable 40 clockwise when viewed from the longitudinal direction of the optical fiber cords 10-1 to 10-*n*. In the present modification, the tape-like cable 40 is wound such that the optical fiber cord 10-*n* is positioned at the center of the trunk section TL or in the vicinity thereof, but the present disclosure is not limited thereto. For example, the tape-like cable 40 may be wound such that the optical fiber cord 10-1 is located at or close to the center of the trunk section TL. Also, the trunk section TL may be formed by winding the tape-like cable 40 counterclockwise.

The plurality of optical fiber cords 10-1 to 10-*n* are sequentially named in accordance with a predetermined rule in the winding direction (that is, clockwise) of the tape-like cable 40. In this case, the optical fiber cords 10-1 to 10-*n* are named in order. In this modification, in the tape-like cable 40 shown in the FIG. 4A, the closer to the optical fiber cord 10-1, the smaller number is named. The plurality of optical fiber cords 10-1 to 10-*n* may be sequentially named in accordance with a predetermined rule in a direction (that is, counterclockwise) opposite to the winding direction of the tape-like cable 40.

Also in the present modification described above, the same operation and effect as those of the embodiment described above can be exhibited. Further, the trunk section TL can be easily formed by simply winding the tape-like cable 40. In addition, in this modification, since the optical fiber cord can be branched one by one along the winding direction of the tape-like cable 40, it is possible to more easily specify the optical fiber cord to be branched. Furthermore, each optical fiber cord can be easily distinguished by naming in accordance with the above rules.

Figure 5:
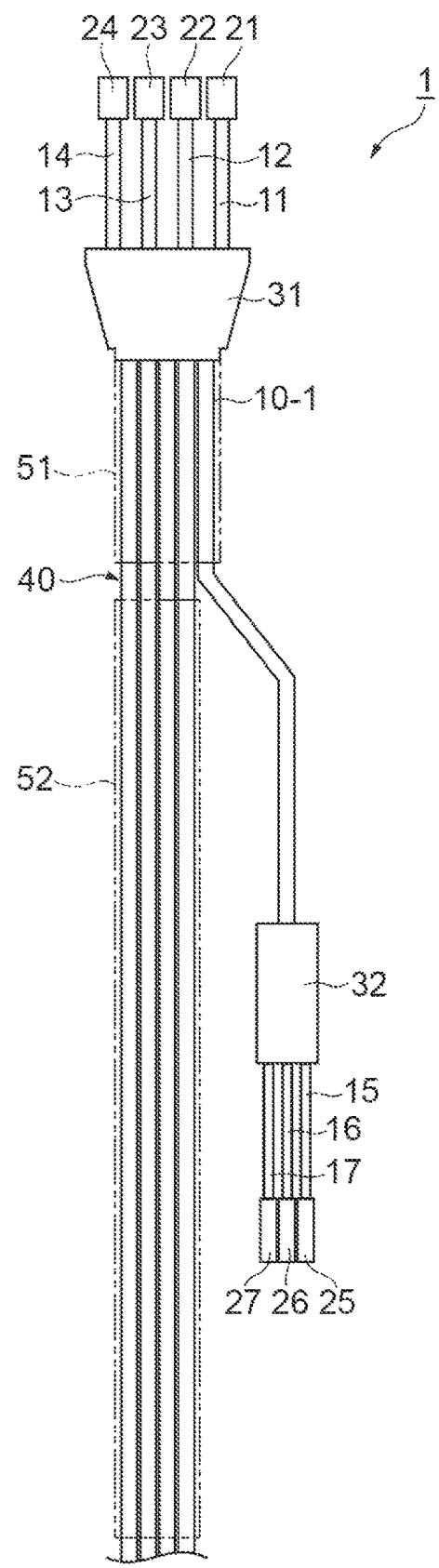
FIG. 5 is a schematic view illustrating another example of the tape-like cable after winding according to the modification.

In the above modification, the state in which the optical fiber cords 10-1 to 10-*n* are bundled is maintained by maintaining the winding state of the tape-like cable 40. Therefore, for example, as shown in FIG. 5, the winding state of the tape-like cable 40 may be maintained by a maintaining member such as a mesh cables 51, 52, a tape, a string, or the like. By using the mesh cables 51, 52, damage to the tape-like cable 40 can be suppressed.

The optical fiber cable according to the present disclosure is not limited to the above-described embodiment and modification, and various other modifications are possible. For example, in the above-described embodiment and modification example, one end of four multi-core optical fiber cords is accommodated in the first branch member, but the present disclosure is not limited thereto. For example, instead of the multicore optical fiber cord, one end of three or less optical fibers may be accommodated in the first branch member, or one end of five or more optical fibers may be accommodated therein.

Figure 6:
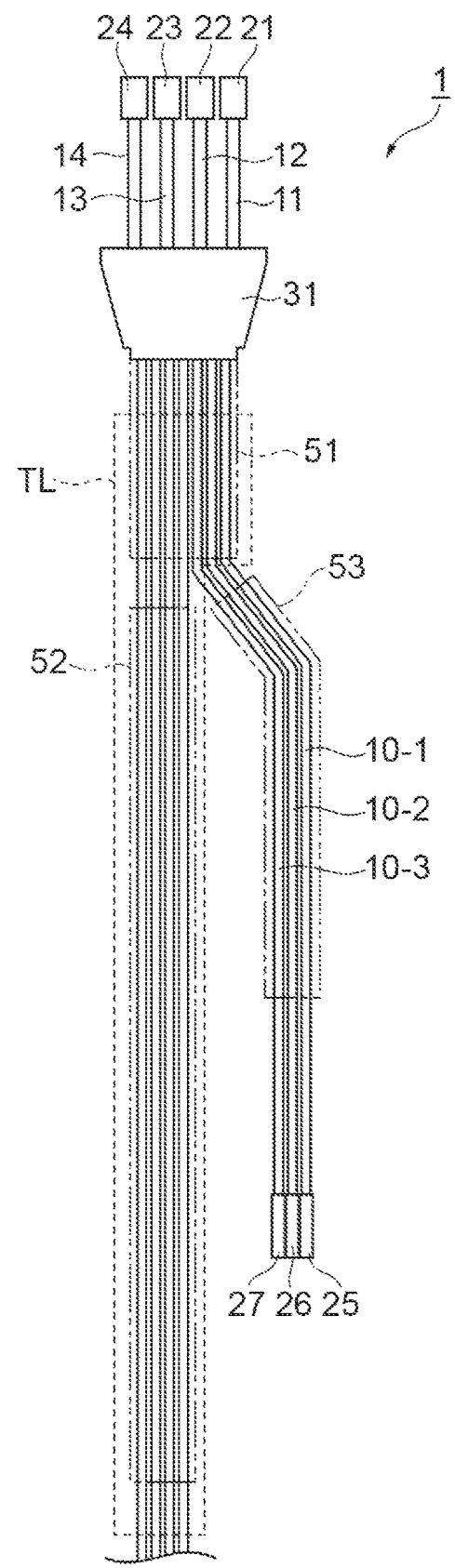
FIG. 6 is a schematic plan view illustrating a main part of an optical fiber cable according to a second modification.

In the above-described embodiment and modification, the other end of the optical fiber cord branched from the trunk section is accommodated in the second branch member, but the present disclosure is not limited thereto. For example, the second branch member may not be used. In this case, for example, as illustrated in FIG. 6, second connectors 25 to 27 may be directly connected to the branched optical fiber cords 10-1 to 10-3, respectively. In this case, at least a part of the branched optical fiber cords 10-1 to 10-3 may be covered by a protection member such as the mesh tube 53. Alternatively, they may be bundled by a tape, a string or the like.

What is claimed is:

1. An optical fiber cable comprising:
   a plurality of optical fiber cords; and
   a trunk section in which the plurality of optical fiber cords are bundled in a cross section honeycomb shape,
   wherein each optical fiber cord included in the plurality of optical fiber cords is separably connected to at least one of other optical fiber cords adjacent to the optical fiber cord in the trunk section,
   wherein the trunk section is a wound structure of a tape-like cable including:
      the plurality of optical fiber cords arranged along one direction intersecting a longitudinal direction of the plurality of optical fiber cords; and
      a connecting portion connecting optical fiber cords adjacent to each other in the one direction.

2. The optical fiber cable according to claim 1, further comprising a branch member configured to accommodate one end of each of the plurality of optical fiber cords,
   wherein the plurality of optical fiber cords include a first optical fiber cord and a second optical fiber cord located closer to a center side of the trunk section than the first optical fiber cord, and
   wherein a first position where the first optical fiber cord branches from the trunk section is closer to the branch member than a second position where the second optical fiber cord branches from the trunk section in an extending direction of the trunk section.

3. The optical fiber cable according to claim 1,
   wherein each optical fiber cord included in the plurality of optical fiber cords is separably connected to all of the other adjacent optical fiber cords in the trunk section.

4. The optical fiber cable according to claim 1,
   wherein, in the trunk section, the plurality of optical fiber cords are named in accordance with a predetermined rule along a clockwise spiral or a counterclockwise spiral in a cross section intersecting a longitudinal direction of the plurality of optical fiber cords.

5. The optical fiber cable according to claim 1,
   wherein the optical fiber cords are included in the plurality of optical fiber cords, and
   wherein the plurality of optical fiber cords are sequentially named in accordance with a predetermined rule, in a winding direction of the tape-like cable or a direction opposite to the winding direction.

6. The optical fiber cable according to claim 1,
   wherein an optical fiber cord located closer to a center of the trunk section is longer.

7. The optical fiber cable according to claim 1,
   wherein an optical fiber cord located closer to a center of the trunk section is shorter.

8. An optical fiber cable comprising optical fiber cords,
   wherein the optical fiber cable includes a trunk section where the optical fiber cords are bundled,
   wherein a cross section of the optical fiber cords in the trunk section is a honeycomb shape, and
   wherein the optical fiber cords include a first optical fiber cord and a second optical fiber cord adjacent to each other, the first optical fiber cord being separably connected to the second optical fiber cord in the trunk section,
   wherein the trunk section is a wound structure of a tape-like cable including:
      the optical fiber cords arranged along a first direction intersecting a longitudinal direction of the optical fiber cords; and
      a connecting portion connecting the first optical fiber cord and the second optical fiber cord in the first direction.

9. The optical fiber cable according to claim 8, further comprising a branch member configured to accommodate a first end of each of the optical fiber cords,
   wherein the second optical fiber cord is located closer to a center of the trunk section than the first optical fiber cord, and
   wherein a first position where the first optical fiber cord branches from the trunk section is closer to the branch member than a second position where the second optical fiber cord branches from the trunk section in an extending direction of the trunk section.

10. The optical fiber cable according to claim 8,
wherein the optical fiber cords include at least one third optical fiber cord adjacent to the first optical fiber cord, and
wherein the first optical fiber cord is separably connected to the second optical fiber cord and the third optical fiber cord in the trunk section.

11. The optical fiber cable according to claim 8,
wherein, in the trunk section, the optical fiber cords are named in accordance with a predetermined rule along a clockwise spiral or a counterclockwise spiral in a cross section intersecting a longitudinal direction of the optical fiber cords.

12. The optical fiber cable according to claim 8,
wherein the optical fiber cords are sequentially named in accordance with a predetermined rule, in a winding direction of the tape-like cable or a direction opposite to the winding direction.

13. The optical fiber cable according to claim 8,
wherein an optical fiber cord located closer to a center of the trunk section is longer.

14. The optical fiber cable according to claim 8,
wherein an optical fiber cord located closer to a center of the trunk section is shorter.

15. An optical fiber cable comprising:
first optical fiber cords and a second optical fiber cord;
a first protection member configured to accommodate the first optical fiber cords and the second optical fiber cord;
a second protection member configured to accommodate the first optical fiber cords;
a first branch member configured to accommodate each first end of the first optical fiber cords and a first end of the second optical fiber cord; and
a second branch member configured to accommodate a second end of the second optical fiber cord,
wherein each of a first cross section of the first optical fiber cords and the second optical fiber cord in the first protection member, and a second cross section of the first optical fiber cords in the second protection member is a honeycomb shape, and
wherein the second optical fiber cord is separably connected to at least one of the first optical fiber cords in the first protection member.

16. The optical fiber cable according to claim 15,
wherein a position where the second optical fiber cord branches from the first optical fiber cords is located between the first protection member and the second protection member in an extending direction of the first optical fiber cords.

17. The optical fiber cable according to claim 15,
wherein, in the first protection member, the first optical fiber cords and the second optical fiber cord are named in accordance with a predetermined rule along a clockwise spiral or a counterclockwise spiral in a cross section intersecting a longitudinal direction of the first optical fiber cords.

18. The optical fiber cable according to claim 15,
wherein at least one of the first protection member and the second protection member is a mesh tube.

19. The optical fiber cable according to claim 15,
wherein the first optical fiber cords and the second optical fiber cord includes a tape-like cable having a wound structure in the first protection member.

* * * * *